United States Patent
Zhou et al.

(10) Patent No.: US 10,256,732 B2
(45) Date of Patent: Apr. 9, 2019

(54) POWER CONVERSION SYSTEM AND METHOD OF OPERATING THE SAME

(71) Applicant: General Electric Company, Schenectady, NY (US)

(72) Inventors: Rui Zhou, Niskayuna, NY (US); Luis Jose Garces, Niskayuna, NY (US); Ravisekhar Nadimpalli Raju, Clifton Park, NY (US); Ashraf Said Atalla, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 53 days.

(21) Appl. No.: 14/885,675

(22) Filed: Oct. 16, 2015

(65) Prior Publication Data
US 2017/0110969 A1    Apr. 20, 2017

(51) Int. Cl.
*H02M 3/335*    (2006.01)
*H02J 3/38*    (2006.01)
(Continued)

(52) U.S. Cl.
CPC ......... *H02M 3/33507* (2013.01); *H02J 3/382* (2013.01); *H02J 3/385* (2013.01);
(Continued)

(58) Field of Classification Search
CPC ........... H02M 7/5387; H02M 3/33507; H02M 7/4807; H02M 3/337; H02J 3/385; H02J 3/382
(Continued)

(56) References Cited

U.S. PATENT DOCUMENTS 7,605,498 B2    10/2009 Ledenev et al.
7,733,679 B2 *  6/2010 Luger .................. H02J 7/35
                                                   323/906
(Continued)

FOREIGN PATENT DOCUMENTS

WO    2012150933 A1    11/2012
WO    2012182230 A1    12/2013
(Continued)

OTHER PUBLICATIONS

Matsuo.,"Novel solar cell power supply system using the multiple-input DC-DC converter", Telecommunications Energy Conference, 1998. Intelec. Twentieth International, 1998, pp. 797-802.
(Continued)

*Primary Examiner* — Kyle J Moody
(74) *Attorney, Agent, or Firm* — GE Global Patent Operation; Nitin N. Joshi

(57) ABSTRACT

A medium voltage direct current (MVDC) collector system for renewable power generation facilities includes at least one renewable energy generation device. The MVDC collector system also includes at least one direct current (DC)-to-DC (DC/DC) power converter coupled to the at least one renewable energy generation device. The at least one DC/DC power converter is configured to shift a switching operation of the DC/DC power converter between full-wave conversion and half-wave conversion. The MVDC collector system further includes at least one controller coupled to the at least one DC/DC power converter. The at least one controller is configured to regulate shifting the switching operation of the at least one DC/DC power converter between full-wave conversion and half-wave conversion.

23 Claims, 6 Drawing Sheets

(51) Int. Cl.
*H02M 3/337* (2006.01)
*H02M 1/00* (2006.01)

(52) U.S. Cl.
CPC ........ *H02M 3/337* (2013.01); *H02M 3/33569* (2013.01); *H02M 2001/0058* (2013.01); *H02M 2001/0074* (2013.01); *H02M 2001/0077* (2013.01); *Y02B 70/1491* (2013.01); *Y02E 10/58* (2013.01)

(58) Field of Classification Search
USPC ............ 363/35, 36, 95, 96, 97, 98, 131, 132
See application file for complete search history.

(56) References Cited

U.S. PATENT DOCUMENTS

| | | | |
|---|---|---|---|
| 8,330,299 | B2 | 12/2012 | Steigerwald et al. |
| 8,576,591 | B2 | 11/2013 | Phadke |
| 8,648,497 | B2 | 2/2014 | Stern et al. |
| 8,674,668 | B2 | 3/2014 | Chisenga et al. |
| 8,829,715 | B2 | 9/2014 | Agamy et al. |
| 8,890,364 | B2 | 11/2014 | O'Brien et al. |
| 8,901,773 | B2 | 12/2014 | Lauinger et al. |
| 2008/0123373 | A1 | 5/2008 | Roesner et al. |
| 2008/0266922 | A1* | 10/2008 | Mumtaz .................. H01L 21/84 363/131 |
| 2009/0231890 | A1 | 9/2009 | Schutten et al. |
| 2011/0031816 | A1 | 2/2011 | Buthker et al. |
| 2011/0241433 | A1 | 10/2011 | Sihler et al. |
| 2012/0218795 | A1 | 5/2012 | Mihalache |
| 2012/0300524 | A1* | 11/2012 | Fornage ................ H02M 5/297 363/132 |
| 2013/0076144 | A1 | 3/2013 | Agamy et al. |
| 2013/0258724 | A1 | 10/2013 | Shen et al. |
| 2014/0001856 | A1 | 1/2014 | Agamy et al. |
| 2014/0183953 | A1 | 7/2014 | Harrison |
| 2014/0185345 | A1* | 7/2014 | Harrison .......... H02M 7/53871 363/127 |
| 2014/0265583 | A1 | 9/2014 | Chaudhuri et al. |
| 2015/0097434 | A1* | 4/2015 | Harrison ................. H02J 3/383 307/43 |
| 2015/0115721 | A1 | 4/2015 | Norrga et al. |
| 2016/0099572 | A1* | 4/2016 | Gupta .................... H02J 3/383 307/52 |

FOREIGN PATENT DOCUMENTS

| | | |
|---|---|---|
| WO | 2014121826 A1 | 8/2014 |
| WO | 2014124672 A1 | 8/2014 |

OTHER PUBLICATIONS

Axelrod.,"A Novel principle of maximum power point tracking for photovoltaic systems", Energy Conference (ENERGYCON), 2014 IEEE International, May 13-16, 2014, pp. 113-119.

Liang et al., "A new wide input range high efficiency photovoltaic inverter", Energy Conversion congress and exposition (ECCE), IEEE, Pisctaway, NJ, USA, pp. 2937-2943, ISBN: 978-1-4244-5286-6, Sep. 12, 2010.

International Search Report issued in connection with corresponding Application No. PCT/US2016/047464 dated Oct. 7, 2016.

* cited by examiner

POWER CONVERSION SYSTEM AND METHOD OF OPERATING THE SAME

BACKGROUND

The field of the disclosure relates generally to power conversion systems and, more particularly, to direct current (DC)-to-DC power converters and power converter configurations for renewable energy facilities.

At least some of known electric power generation facilities are configured to use renewable energy sources for generation of electric power. Examples of such facilities include most solar power generation facilities, most geothermal power generation facilities, and some wind power generation facilities. Most known renewable energy generation facilities, for example, solar power generation facilities include photovoltaic (PV) arrays that generate low voltage direct current (LVDC) power, e.g., in a range between approximately 0.6 kilovolts (kV) and approximately 1.5 kV. Such known solar facilities also include a power conversion system, i.e., a LVDC solar collector system that converts the collected DC power to alternating current (AC). Such known LVDC solar collector systems include a plurality of strings, where each string includes a PV array and a DC-to-AC (DC/AC) power converter coupled to the PV array. The DC/AC power converters are configured to convert the LVDC power to AC power at a low voltage value of approximately 600 volts AC (VAC). Each string also includes a step-up transformer configured to increase the 600 VAC power to a medium voltage (MV) within a range between approximately 2 kV and approximately 34.5 kV and a downstream circuit breaker between the transformer and a MV bus. The MV power is further stepped-up to a higher AC voltage suitable for use on an AC electric power grid system, e.g., a high voltage (HV) of approximately 345 kV. Since each solar power generation facility may include a large number of such strings, construction and maintenance costs for such facilities are substantially increased.

Such known LVDC solar collector systems have a relatively narrow band of flexibility with respect to regulating the voltage and power outputs of the solar arrays prior to transformation to AC and the subsequent voltage step-ups. Specifically, there is substantially no voltage and power control mechanisms between the solar arrays and the DC/AC power converters, where the circuit breakers in the strings provide for coarse power control. Also, the switching devices of the DC/AC power converters typically have low frequency switching rates, thereby inhibiting integration of maximum power point tracking (MPPT) features into the control strategy of the individual strings of the LVDC solar collector systems. Moreover, the primary fault protection feature for each string is the associated string circuit breaker which may be configured to isolate the associated string after a predetermined period of time, and the protective features may be unidirectional.

BRIEF DESCRIPTION

In one aspect, a medium voltage direct current (MVDC) collector system for renewable power generation facilities is provided. The MVDC collector includes at least one renewable energy generation device. The MVDC collector system also includes at least one direct current (DC)-to-DC (DC/DC) power converter coupled to the at least one renewable energy generation device. The at least one DC/DC power converter is configured to shift a switching operation of the DC/DC power converter between full-wave conversion and half-wave conversion. The MVDC collector system further includes at least one controller coupled to the at least one DC/DC power converter. The at least one controller is configured to regulate shifting the switching operation of the at least one DC/DC power converter between full-wave conversion and half-wave conversion.

In a further aspect, a renewable energy generation facility is provided. The facility includes at least one electrical bus and a plurality of renewable energy generation devices. The facility also includes a plurality of direct current (DC)-to-DC (DC/DC) power converters. Each DC/DC power converter of the plurality of DC/DC power converters is coupled to at least one renewable energy generation device of the plurality of renewable energy generation devices. Each DC/DC power converter is configured to shift a switching operation between full-wave conversion and half-wave conversion. The plurality of DC/DC power converters is coupled to the at least one electrical bus. The facility also includes at least one controller coupled to the at least one DC/DC power converter. The at least one controller is configured to regulate shifting the switching operation of the at least one DC/DC power converter between full-wave conversion and half-wave conversion.

In another aspect, a method of operating a medium voltage direct current (MVDC) collector system is provided. The MVDC collector system includes at least one renewable energy generation device and at least one direct current (DC)-to-DC (DC/DC) power converter coupled to the at least one renewable energy generation device. The method includes shifting a switching operation of the at least one DC/DC power converter between full-wave conversion and half-wave conversion.

DRAWINGS

These and other features, aspects, and advantages of the present disclosure will become better understood when the following detailed description is read with reference to the accompanying drawings in which like characters represent like parts throughout the drawings, wherein.

Figure 1:
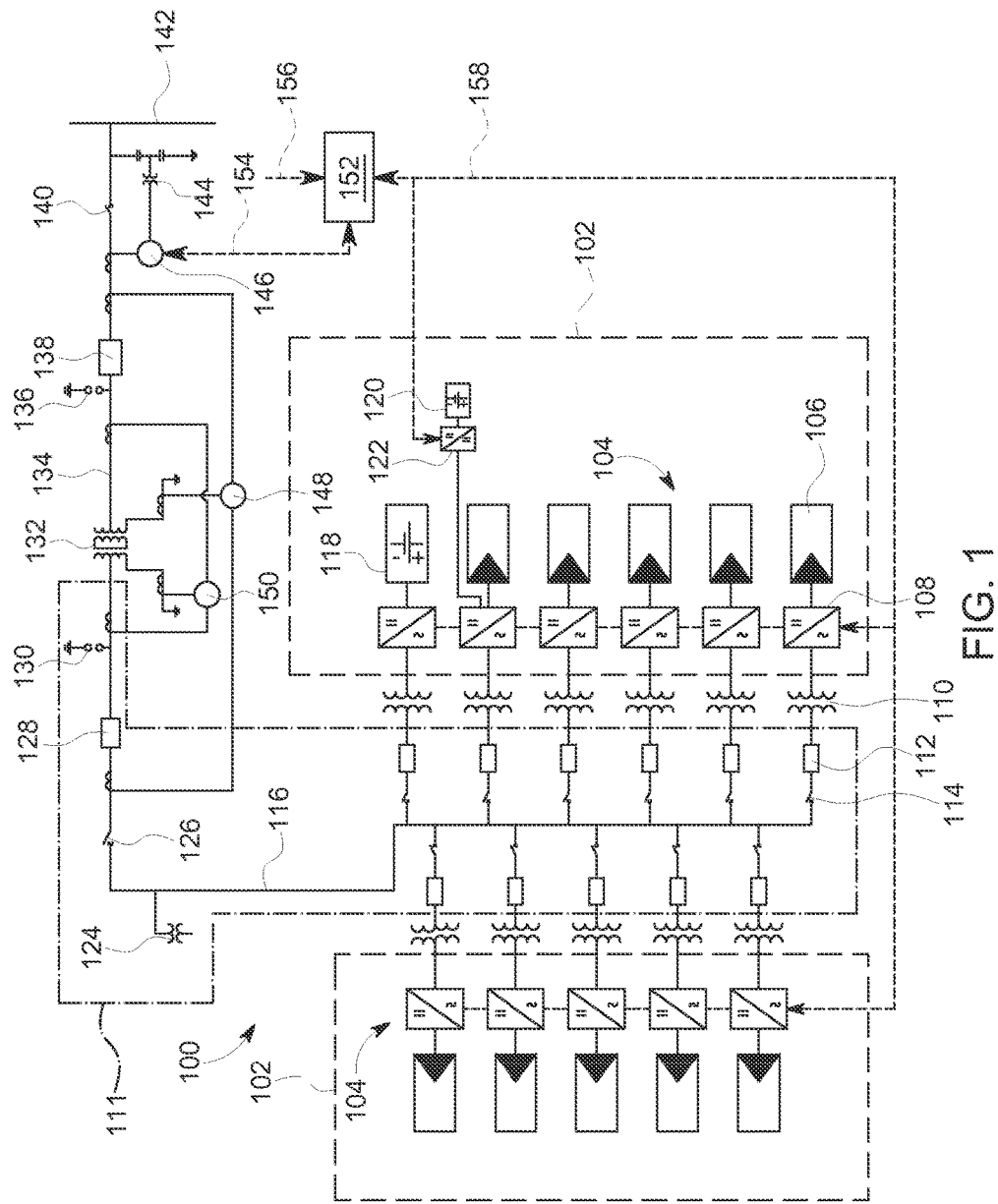
FIG. 1 is a schematic view of a prior art renewable power generation facility.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The medium voltage direct current (MVDC) solar collector systems and solar power generation facilities described herein facilitate improved operational capabilities as compared to known low voltage direct current (LVDC) solar collector systems. The MVDC solar collector systems described here facilitate removing many individual DC-to-alternating current (AC) (DC/AC) power converters and step-up transformers from each string of photovoltaic (PV) arrays, thereby significantly decreasing balance of plant costs associated with solar power generation facilities. The systems and facilities described herein include isolable DC/DC power converters that are resonant power converters including high-frequency (HF) transformers (within a range of approximately 5 kiloHertz (kHz) and approximately 100 kHz). Such DC/DC power converters are configured to step-up LVDC voltages within a range between approximately 0.6 kilovolts (kV) and approximately 1.5 kV to MVDC with a range between approximately 2 kV and approximately 40 kV. The increased frequency range facilitates increasing the energy efficiency of the power converters and facilitating maximum power point tracking (MPPT) features in the control strategy of individual strings. One embodiment of the isolable DC/DC power converters includes circuits that have a power rating of approximately 150 kiloWatts (kW) with a switching frequency up to approximately 100 kHz through switches such as silicon carbide (SiC) metal-oxide-semiconductor field-effect transistors (MOSFETs) and low-cost ferrite core material in the HF transformer. Another embodiment of the isolable DC/DC power converters has a circuit that has a power rating of approximately 1.5 megaWatt (MW) with a switching frequency of approximately 5 kHz power through switches of either silicon-based insulated-gate bipolar transistors (IGBTs) or SiC MOSFETs.

The isolable DC/DC power converters described herein facilitate extending the voltage and power operating ranges through adaptive and configurable full-bridge/half-bridge operation. Also, the embodiments for the isolable DC/DC power converters described herein facilitate extending the voltage and power operating ranges through use of HF switching operation of the switches, where MPPT voltage and power control features within the control strategy of the isolable DC/DC power converters are a function of the HF frequency employed. Moreover, the embodiments for the isolable DC/DC power converters described herein facilitate extending the voltage and power operating ranges through use of series/parallel configurations. Furthermore, voltage control in the embodiments of the isolable DC/DC power converters described herein facilitate rapid and significant decreases of the voltage gain of the power converters when either an overload condition or a short circuit condition is sensed, thereby substantially isolating the affected DC/DC power converter from an interconnecting MVDC bus and the other power converters, at least one of which is faulted. Additionally, a diode is positioned between the MVDC bus and each DC/DC power converter to further facilitate isolation of the power converters and to allow only unidirectional power flow out of the DC/DC power converters into the MVDC bus.

FIG. 1 is a schematic view of a prior art renewable power generation facility 100. Prior art renewable power generation facility 100 is a solar power generation facility that includes a low voltage direct current (LVDC) collector system 102. As used herein, the term "low voltage direct current" refers to the voltage range defined between 40 volts DC (V DC) and 1.5 kilovolts DC (kV DC). LVDC collector system 102 includes a plurality of photovoltaic (PV) strings 104. Each PV string 104 includes at least one renewable energy generation device, i.e., a PV array 106 rated for approximately 1.5 kV DC coupled to a direct current-to-alternating current (DC/AC) power converter 108 rated for approximately 3 megawatts (MW). Renewable power generation facility 100 includes ten PV strings 104, therefore, facility 100 is rated for 30 MW. Each DC/AC power converter 108 converts the approximately 1.5 kV DC generated by PV arrays 106 to approximately 600 V AC. Each PV string 104 also includes a step-up transformer 110 coupled to a respective DC/AC power converter 108 that steps-up the voltage generated by the respective DC/AC power converter 108 from approximately 600 V AC to approximately 34.5 kV AC in the medium voltage AC (MVAC) range. As used herein, the term "medium voltage alternating current" refers to the voltage range defined between 600 V AC and 69 kV AC.

Renewable power generation facility 100 also includes a MVAC collector system 111 coupled to each step-up transformer 110. MVAC collector system includes a portion of each PV string 104. Specifically, each PV string 104 further includes at least one sensing relay 112 coupled to a respective step-up transformer 110 that is configured to sense one or more of current and voltage on the respective string and provide indications to the operators of facility 100 and automatic protective features, e.g., and without limitation, undervoltage, overvoltage, and overcurrent protections. Each PV string 104 also includes a circuit breaker 114 coupled to a respective sensing relay 112. MVAC collector system 111 also includes a MVAC bus 116 and each circuit breaker 114 is coupled to MVAC bus 116. Each circuit breaker 114 is configured to isolate the respective PV string 104 from MVAC bus 116.

Some embodiments of LVDC collector system 102 include a bulk energy storage device 118 that includes one or more of, and without limitation, storage batteries and momentum devices. Bulk energy storage device 118 is coupled to MVAC bus 116 through a DC/AC power converter 108, step-up transformer 110, sensing relay 112, and circuit breaker 114. Other embodiments of LVDC collector system 102 include a distributed energy storage system 120 coupled to a DC/AC power converter 108 of one of strings 104 through a direct current-to-direct current (DC/DC) power converter 122.

MVAC collector system 111 further includes a 34.5 kV AC outdoor voltage transformer 124 coupled to MVAC bus 116, where transformer 124 is configured to transmit power to a variety of loads (not shown). MVAC collector system 111 also includes a circuit breaker 126 in series with a vacuum circuit breaker 128 with a ground switch (not shown), where circuit breaker 128 is configured for 38 kV AC, 500 amperes, and a 40 kiloampere (kA) interrupting rating. MVAC collector system 111 further includes a plurality of surge arrestors 130 rated for 34.5 kV AC coupled to MVAC bus 116 downstream of vacuum circuit breaker 128.

Renewable power generation facility 100 also includes a step-up transformer 132 coupled to MVAC bus 116 and a high voltage (HV) AC bus 134. As used herein, the term "high voltage" refers to voltage greater than 69 kV AC. Step-up transformer 132 steps-up the 34.5 kV AC voltage on bus 116 to 345 kV AC on bus 134. HV AC bus 134 includes a plurality of surge arrestors 136 coupled thereto. Also, HV AC bus 134 includes a sulfur hexafluoride ($SF_6$) circuit breaker 138 rated for 362 kV AC, 2000 amperes, and a 40 kA interrupting rating. HV AC bus 134 further includes double end breaker disconnect switch 140 configured to coupled renewable power generation facility 100 to a utility grid 142.

Renewable power generation facility 100 further includes a plurality of instrumentation including, without limitation, a capacitive voltage transformer (CCVT) 144, a HV relay 146, a transformer HV-side relay 148, a transformer MV-side relay 150, and current transformers (CTs) and potential transformers (PTs) (none shown). Renewable power generation facility 100 also includes a controller 152 configured to receive signals from devices including, without limitation, signals (not shown) from the current transformers and voltage transformers, signals 154 to and from HV relay 146, and utility reference signals and commands 156. Controller 152 also transmits and receives command and measurement signals 158 from and to, respectively, devices that includes, without limitation, distributed energy storage system 120 and DC/AC power converters 108.

Figure 2:
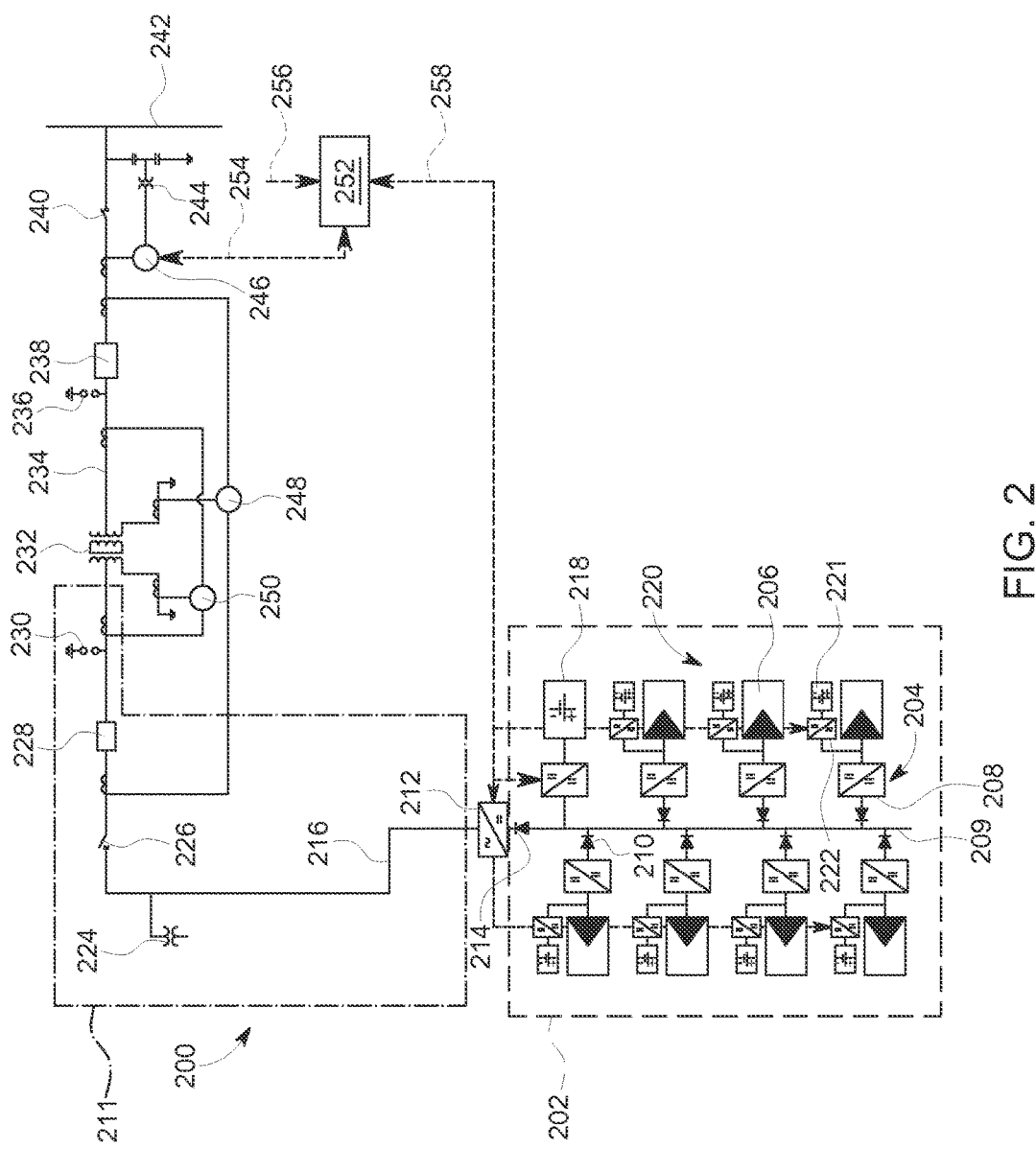
FIG. 2 is a schematic perspective view of an exemplary renewable power generation facility.

FIG. 2 is a schematic perspective view of an exemplary renewable power generation facility 200. In the exemplary embodiment, renewable power generation facility 200 is a solar power generation facility that includes a medium voltage direct current (MVDC) collector system 202. As used herein, the term "medium voltage direct current" refers to the voltage range defined between 1.5 kV DC and 40 kV DC. MVDC collector system 202 includes a plurality of PV strings 204. Each PV string 204 includes at least one renewable energy generation device, i.e., a PV array 206 rated for approximately 1.5 kV DC coupled to a direct current-to-direct current (DC/DC) power converter 208 rated for approximately 3 MW. Renewable power generation facility 200 includes ten PV strings 204 (only seven shown), therefore, facility 200 is rated for 30 MW. Alternatively, any number of PV arrays 206 and DC/DC power converters 208 have any voltage and power ratings that enable operation of renewable power generation facility 200 as described herein, and as such, facility 200 is fully scalable for any power generation rating.

In the exemplary embodiment, each DC/DC power converter 208 converts the approximately 1.5 kV DC generated by PV arrays 206 to approximately +/−10 kV DC (positive or negative polarity). In contrast to PV strings 104 (shown in FIG. 1), each PV string 204 is devoid of DC/AC power converter 108, step-up transformer 110, sensing relay 112, and circuit breaker 114 (all shown in FIG. 1). Specifically, in contrast to facility 100 where PV strings 104 convert a LVDC voltage of 1.5 kV DC to a MVAC voltage of 34.5 kV AC through DC/AC power converter 108 and transformer 110, PV string 204 increases the LVDC voltage of 1.5 kV DC to +/−10 kV DC with only DC/DC power converter 208.

Also, in the exemplary embodiment, MVDC collector system 202 includes a MVDC bus 209 and each string PV string 204 includes a diode stack 210 coupled to MVDC bus 209. Each diode stack 210 is configured to facilitate unidirectional transmission of electric power from the respective DC/DC power converter 208 to MVDC bus 209 and to facilitate blocking electric power flow from MVDC bus 209 to DC/DC power converter 208. Therefore, in contrast to facility 100 where a circuit breaker 114 is used to individually isolate each PV string 104, each diode stack 210 facilitates isolating MVDC bus 209 from the associated PV string 204 when a fault is located on the respective PV string 204.

Further, in the exemplary embodiment, renewable power generation facility 200 includes a MVAC collector system 211 coupled to MVDC collector system 202 through a DC/AC power converter 212 and a diode stack 214. MVAC collector system 211 includes a MVAC bus 216 coupled to DC/AC power converter 212. Diode stack 214 facilitates unidirectional transmission of electric power from the MVDC bus 209 to and to DC/AC power converter 212 and facilitates blocking electric power flow from DC/AC power converter 212 to MVDC bus 209. As such, diode stack 214 facilitates isolating MVDC collector system 202 from faults located on MVAC collector system 211 and further downstream. DC/AC power converter 212 converts +/−10 kV DC from MVDC bus 209 to 14 kV AC.

Moreover, in the exemplary embodiment, MVDC collector system 202 includes a bulk energy storage device 218 that includes one or more of, and without limitation, storage batteries and momentum devices. Bulk energy storage device 218 is coupled to MVDC bus 209 through a DC/DC power converter 208. Also, MVDC collector system 202 includes a distributed energy storage system 220 that includes a plurality of distributed energy storage devices 221. Each distributed energy storage device 221 includes one or more of, and without limitation, storage batteries and momentum devices. Also, each storage device 221 is coupled to a respective DC/DC power converter 208 through a distributed DC/DC power converter 222, where each string 204 includes one distributed energy storage device 221 and one distributed DC/DC power converter 222.

MVAC collector system 211 further includes a 14 kV AC outdoor voltage transformer 224 coupled to DC/AC power converter 212, where transformer 224 is configured to transmit power to a variety of loads (not shown). MVAC collector system 211 also includes a circuit breaker 226 in series with a vacuum circuit breaker 228 with a ground switch (not shown), where circuit breaker 228 is configured for 14 kV AC, 1500 amperes, and a 40 kiloampere (kA) interrupting rating. MVAC collector system 211 further includes a plurality of surge arrestors 230 rated for 14 kV AC coupled to MVAC bus 216 downstream of vacuum circuit breaker 228.

Renewable power generation facility 200 also includes a step-up transformer 232 coupled to MVAC bus 216 and a high voltage (HV) AC bus 234. Step-up transformer 232 steps-up the 14 kV AC voltage on bus 216 to 345 kV AC on bus 234. HV AC bus 234 includes a plurality of surge arrestors 236 coupled thereto. Also, HV AC bus 234 includes a sulfur hexafluoride ($SF_6$) circuit breaker 238 rated for 362 kV AC, 2000 amperes, and a 40 kA interrupting rating. HV AC bus 234 further includes double end breaker disconnect switch 240 configured to coupled renewable power generation facility 200 to a utility grid 242.

Renewable power generation facility 200 further includes a plurality of instrumentation including, without limitation, a capacitive voltage transformer (CCVT) 244, a HV relay 246, a transformer HV-side relay 248, a transformer MV-side relay 250, and current transformers (CTs) and potential transformers (PTs) (none shown). Renewable power generation facility 200 also includes a controller 252 configured to receive signals from devices including, without limitation, signals (not shown) from the current transformers and voltage transformers, signals 254 to and from HV relay 246, and utility reference signals and commands 256. Controller 252 also transmits and receives command and measurement signals 258 from and to, respectively, devices that include, without limitation, distributed energy storage system 220 including DC/DC power converters 222, DC/DC power converters 208, and DC/AC power converter 212.

Figure 3:
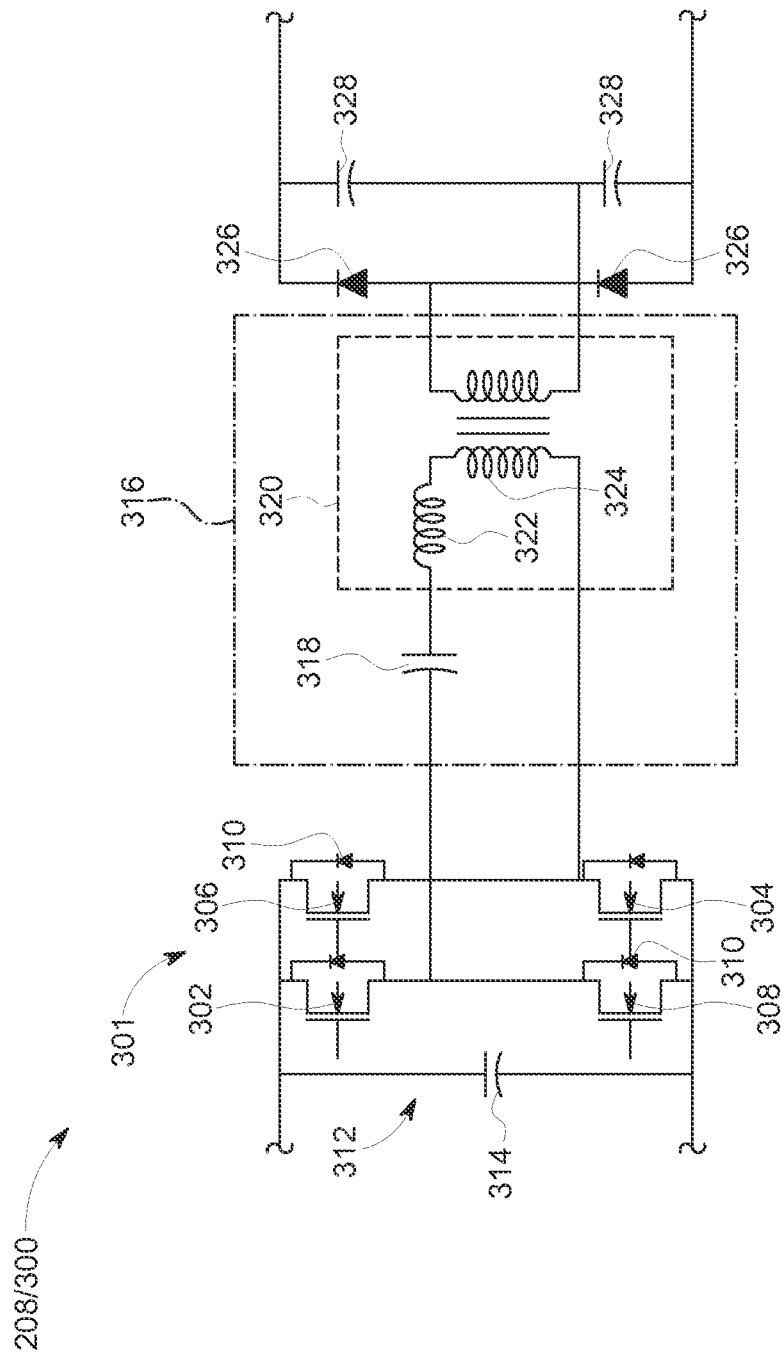
FIG. 3 is a schematic view of a portion of an exemplary direct current (DC)-to-DC (DC/DC) power converter that may be used with the renewable power generation facility shown in FIG. 2.

FIG. 3 is a schematic view of a portion of an exemplary DC/DC power converter 300 that may be used as DC/DC power converter 208 with renewable power generation facility 200 (shown in FIG. 2). More specifically, FIG. 3 shows a full bridge resonant converter circuit 301 rated for approximately 150 kW. Since DC/DC power converter 300 is rated for approximately 3 MW, converter 300 includes at least 20 full bridge resonant converter circuits 301.

In the exemplary embodiment, full bridge resonant converter circuit 301 includes a plurality of substantially identical switching devices, i.e., silicon carbide (SiC) metal-oxide-semiconductor field-effect transistors (MOSFETs) 302, 304, 306, and 308. In parallel with each MOSFET 302, 304, 306, and 308 is an anti-paralleling diode 310. In some embodiments, anti-paralleling diode 310 is a body diode of MOSFETs 302, 304, 306, and 308. A DC link 312 including at least one capacitive device 314 is coupled to the inputs of MOSFETs 302, 304, 306, and 308. DC link 312 facilitates maintaining a nominal 1.5 kV DC voltage potential, either positive or negative polarity, at the input to MOSFETs 302, 304, 306, and 308. The voltage potential of DC link 312 varies at a wide range to facilitate MPPT control for PV panel 206.

Also, in the exemplary embodiment, MOSFETs 302, 304, 306, and 308 define a full-bridge configuration. As described further below, each MOSFET 302, 304, 306, and 308 is coupled to controller 252 (shown in FIG. 2) that regulates the status of MOSFETs 302, 304, 306, and 308. Specifically, controller 252 and MOSFETs 302, 304, 306, and 308 are configured to maintain at least a first portion of MOSFETs 302, 304, 306, and 308 in an OFF status and a second portion of MOSFETs 302, 304, 306, and 308 in an ON status to facilitate shifting switching operation of DC/DC power converter 300 from full-wave conversion to half-wave conversion and back to full-wave conversion to at least partially regulate the output voltage of DC/DC power converter 300. In full bridge operation, MOSFETs 302, 304, 306, and 308 are in switching operation. In half-bridge operation, MOSFET 304 is in an ON status, MOSFET 306 is in an OFF status, and MOSFETs 302 and 308 are in switching operation. Alternatively, in half-bridge operation, MOSFET 308 is in an ON status, MOSFET 302 is in an OFF status, and MOSFETs 306 and 304 are in switching operation.

Further, in the exemplary embodiment, full bridge resonant converter circuit 301 includes a resonant section 316 that includes a resonant capacitive device 318 and a high frequency (HF) transformer 320 that includes a plurality of inductive devices 322 and 324 in series with resonant capacitive device 318 such that full bridge resonant converter circuit 301 is a resonant LLC converter circuit. Resonant section 316 with HF transformer 320 provides isolation capabilities for DC/DC power converter 300 with relatively low electrical losses. The core of HF transformer 320 is fabricated from low-cost ferrite. Alternatively, any core material that enables operation of HF transformer 320, full bridge resonant converter circuit 301, and DC/DC power converter 300 as described herein is used. Full bridge resonant converter circuit 301 also includes a plurality of rectifying diodes 326 and capacitive devices 328 to facilitate DC voltage generation.

Moreover, in the exemplary embodiment, full bridge resonant converter circuit 301 receives and converts 1.5 kV DC to 10 kV DC (positive or negative polarity) with a nominal switching frequency of approximately 100 kHz and a power rating of approximately 150 kW. Since, DC/DC power converter 300 is rated for approximately 3 MW, converter 300 includes at least 20 full bridge resonant converter circuits 301. Alternatively, full bridge resonant converter circuit 301 and DC/DC power converter 300 are configured for any input voltage, output voltage, electric power transmission, and switching frequency ratings that enable operation of full bridge resonant converter circuit 301, DC/DC power converter 300, and renewable power generation facility 200 as described herein.

As described above, each PV string 204 includes a respective diode stack 210 (both shown in FIG. 2) between respective DC/DC power converter 300 and MVDC bus 209 (shown in FIG. 2) configured to facilitate unidirectional transmission of electric power from respective DC/DC power converter 300 to MVDC bus 209 and to facilitate blocking electric power flow from MVDC bus 209 to DC/DC power converter 300. In alternative embodiments of DC/DC power converter 300, where bi-directional power flow is needed through MVDC collector system 202, a stack of high voltage switches (not shown) are added to the output stage of resonant DC/DC power converter 300 in the place of rectifying diodes 326 to enable bi-directional power.

Further, as described below, voltage regulation of DC/DC power converter 300 is facilitated through regulation of the switching frequency of MOSFETs 302, 304, 306, and 308, reconfiguration between full bridge and half bridge operation, and maximum power point tracking (MPPT) features.

Figure 4:
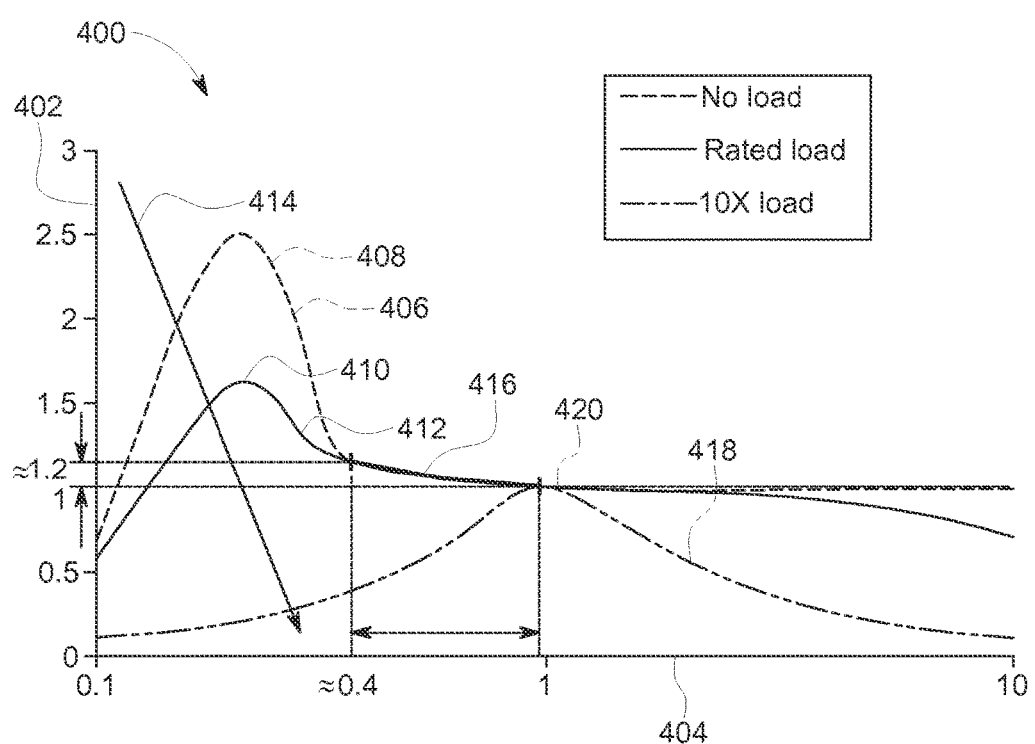
FIG. 4 is a graphical view of operational features of the DC/DC power converter shown in FIG. 3.

FIG. 4 is a graphical view, i.e., graph 400 of operational features of the DC/DC power converter shown in FIG. 3. Specifically, graph 400 illustrates a normalized voltage gain of DC/DC power converters 208 and 300 (shown in FIGS. 2 and 3, respectively) as a function of power transmission through converters 208/300 and a normalized nominal switching frequency. As described in more detail below, controller 252 (shown in FIG. 2) is configured to regulate a voltage gain of DC/DC power converters 208/300 through regulation of a switching frequency of switching devices 302, 304, 306, and 308 (shown in FIG. 3). Graph 400 includes a y-axis 402 representative of normalized voltage gain of DC/DC power converters 208/300 per unit (pu) on a linear scale extending from a value of 0 to a value of 3 in increments of 0.5 pu. Graph 400 also includes an x-axis 404 representative of normalized nominal switching frequency of DC/DC power converters 208/300 per unit (pu) on a logarithmic scale extending from a value of 0.1 pu to a value of 10 pu. The value of 1 on x-axis 404 is equivalent to the rated switching frequency, i.e., for MOSFETs 302, 304, 306, and 308 that is approximately 100 kHz.

Graph 400 also includes a first, i.e., no load curve 406 that represents the normalized voltage gain of DC/DC power converter 208/300 as a function of normalized switching frequency of DC/DC power converter 208/300. Specifically, no load curve 406 represents the predetermined voltage gain for DC/DC power converter 208/300 when it is energized without any load thereon, i.e., the electric power transmission through converter 208/300 is approximately zero. Curve 406 includes a "low frequency" bump 408 below approximately 0.4 pu, which is typical for a LLC circuit. "Low frequency" bump 408 represents a second resonant frequency, below which the resonant tank circuit behaves as a capacitive load, and above which the resonant tank circuit behaves as an inductive load.

Graph 400 further includes a second, i.e., rated load curve 410 that represents the normalized voltage gain of DC/DC power converter 208/300 as a function of normalized switching frequency of DC/DC power converter 208/300. Specifically, rated load curve 410 represents the predetermined voltage gain for DC/DC power converter 208/300 when it is energized with and carrying rated load thereon, i.e., the electric power transmission through converter 208/300 is approximately 3 MW. Arrow 414 indicates the trend of increasing power for curves 406, 410, and beyond. Curve 410 includes a "low frequency" bump 412 below approximately 0.4 pu similar to "low frequency" bump 408.

Curves 406 and 410 include an overlapping section, i.e., an operating range 416 for DC/DC power converter 208/300 between approximately 0.4 pu and 1 pu on x-axis 404. For those normalized frequencies above 1 pu, curves 406 and 410 diverge and DC/DC power converter 208/300 is typically not operated in that range above 1 pu. In general, DC/DC power converter 208/300 is regulated within operating range 416 as defined by approximately 0.4 pu to approximately 1 pu on x-axis 404 and a low end voltage gain of approximately 1 pu and a high end voltage gain of approximately 1.2 pu on y-axis 402. For example, if a normalized voltage gain of 1 pu is desired to increase the voltage of 1.5 kV DC to 10 kV DC, the switching frequency of the operating MOSFETs 302, 304, 306, and 308 is maintained at 1 pu, i.e., the nominal switching frequency of approximately 100 kHz. Also, for example, if there is a voltage decrease on the input side of DC/DC power converter 208/300 from 1.5 kV DC to approximately 1.25 kV DC as measured in real-time, controller 252 receives real-time values for, without limitation, input voltage, output voltage, and electric current/power transmission of converter 208/300 and uses the algorithms and instructions programmed therein to command an increase in the voltage gain to 1.2 pu through decreasing the switching frequency to 0.4 pu, i.e., approximately 40 kHz, thereby maintaining the output voltage of DC/DC power converter 208/300 at approximately 10 kV DC.

Alternatively, for half-wave conversion, since only half of full bridge resonant converter circuit 301 is in switching operation at any one time, the equivalent input voltage is half of DC input voltage. Therefore, the equivalent voltage gain is within a range between approximately 0.5 pu and 0.75 pu for curve 410 and between 0.5 pu and 1.2 pu for curve 406. Combining half-wave and full-wave conversion, one can achieve a much wider voltage gain range, e.g., from 0.5 pu to 1.2 pu.

Graph 400 further includes a third, i.e., ten times (10×) rated load curve 418 that represents the normalized voltage gain of DC/DC power converter 208/300 as a function of normalized switching frequency of DC/DC power converter 208/300. Specifically, 10× rated load curve 418 represents the predetermined voltage gain for DC/DC power converter 208/300 when it is energized with ten times the rated load thereon, i.e., the electric power transmission through converter 208/300 is approximately 30 MW. Curve 406 includes a peak 420 at approximately 1.0 pu on x-axis 404 and decreases towards a voltage gain of approximately zero symmetrically in each direction along x-axis 404. For example, in the event that DC/DC power converter 208/300 experiences a rapid increase in power transmission as measured in real-time, controller 252 receives real-time values for, without limitation, input voltage, output voltage, and electric current/power transmission of converter 208/300 and uses the algorithms and instructions programmed therein to command a rapid and significant decrease in the voltage gain to approximately 0 pu through decreasing the switching frequency to approximately 0 pu (not shown in FIG. 4), thereby substantially shutting down and isolating converter 208/300.

In the exemplary embodiment, controller 252 uses maximum power point tracking (MPPT) to regulate power conversion through DC/DC power converter 208/300. Regulating the switching frequency and shifting switching operation converter between full-wave conversion and half-wave conversion, both as described above, enhances MPPT operation in DC/DC power converter 208/300. MPPT features, as embedded within controller 252 and DC/DC power converters 208/300, enhance an efficiency of power conversion from renewal sources, e.g., PV arrays 206, to usable electric power through regulating the resistance, i.e., load as a function of environmental and other conditions to generate a substantially maximum power for the conditions. Such conditions include, without limitation, temperatures of PV arrays 206. Therefore, the temperatures of PV arrays 206, the output power therefrom, and the output power of DC/DC power converters 208/300 are sampled in real-time and the measurements are used to calculate the desired power point of operation of DC/DC power converters 208/300 uses the algorithms and instructions programmed within controller 252 and DC/DC power converters 208/300. As such, regulating the switching frequency of switching devices 302, 304, 306, and 308 enhances MPPT within renewable power generation facility 200 through enhanced voltage regulation and power regulation through a wider operating range for voltage input to DC/DC power converters 208/300 from PV arrays 206. Also, shifting switching operation converter between full-wave conversion and half-wave conversion, i.e., effectively either halving or doubling the voltage output of DC/DC power converters 208/300 enhances MPPT within renewable power generation facility 200 through a wider operating range for power output from DC/DC power converters 208/300. In addition, shifting switching operation to half-wave conversion from full-wave conversion facilitates enhancing granular regulation of voltage and power.

Figure 5:
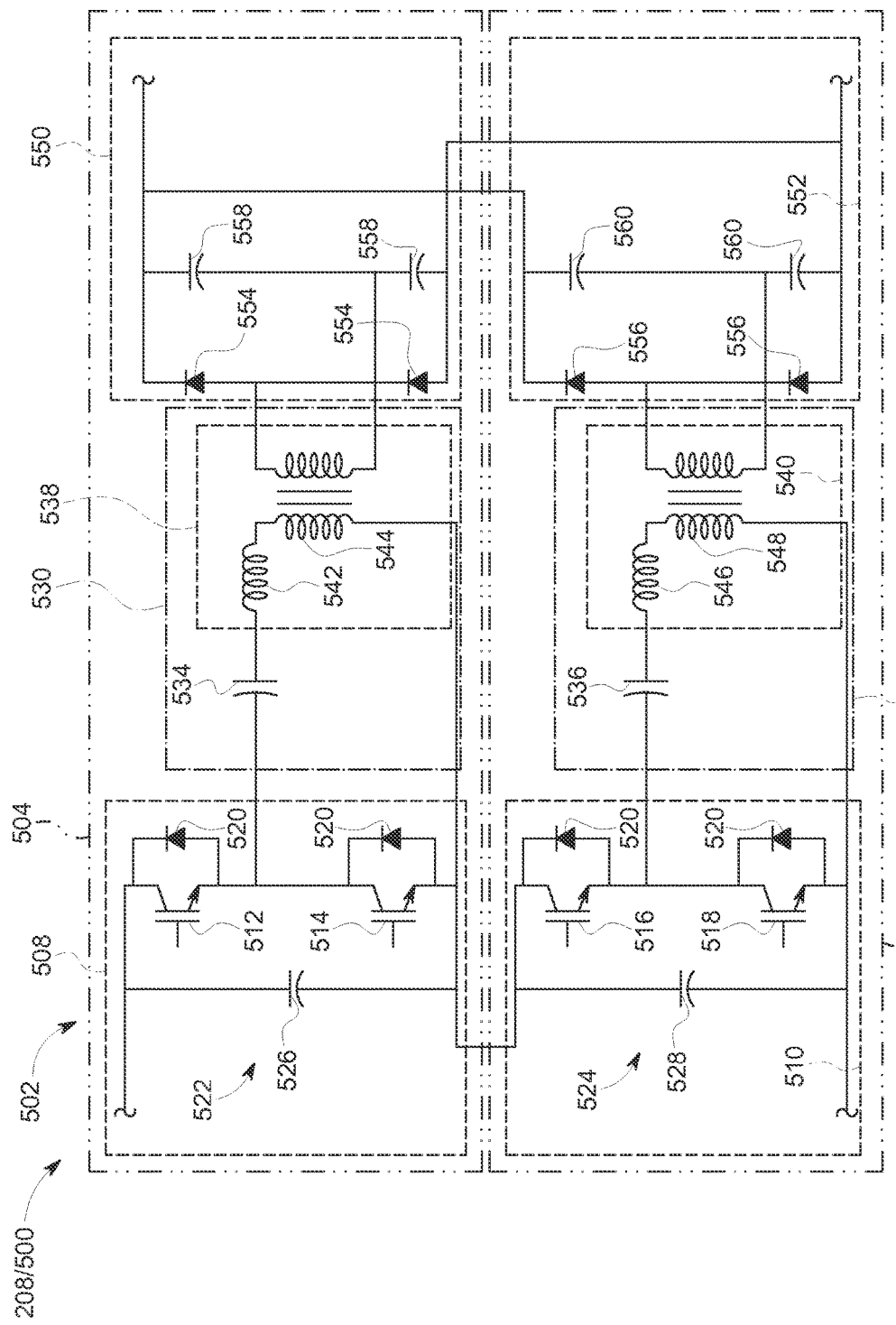
FIG. 5 is a schematic view of a portion of an alternative DC/DC power converter that may be used with the renewable power generation facility shown in FIG. 2.

FIG. 5 is a schematic view of a portion of an alternative DC/DC power converter 500 that may be used as DC/DC power converter 208 with renewable power generation facility 200 (shown in FIG. 2). More specifically, FIG. 5 shows a dual bridge resonant converter circuit 502 rated for approximately 150 kW. Since DC/DC power converter 500 is rated for approximately 3 MW, converter 500 includes at least 20 dual bridge resonant converter circuits 502.

In this alternative embodiment, dual bridge resonant converter circuit 502 includes two half-bridge resonant converter circuits 504 and 506, where circuits 504 and 506 each include an input section 508 and 510, respectively, and where input sections 508 and 510 are coupled in parallel. Each of input sections 508 and 510 includes a plurality of substantially identical switching devices, i.e., silicon-based insulated gate bipolar transistors (IGBTs) 512, 514, 516, and 518. In parallel with each of IGBTs 512, 514, 516, and 518 is an anti-paralleling diode 520. Each of input sections 508 and 510 also includes a portion of a DC link 522 and 524 including at least one capacitive device 526 and 528, respectively, is coupled to the inputs of IGBTs 512 sand 514 in circuit 504 and IGBTs 516 and 518 in circuit 506, respectively. DC links 522 and 524 each facilitates maintaining a 750 V DC voltage potential, either positive or negative polarity, at the input to IGBTs 512 sand 514 in circuit 504 and IGBTs 516 and 518 in circuit 506, respectively, to maintain an overall voltage potential of 1.5 kV DC, either positive or negative polarity, at the input to dual bridge resonant converter circuit 502.

Also, in this alternative embodiment, IGBTs 512 and 514 of circuit 504 define a first half-bridge configuration and IGBTs 516 and 518 of circuit 508 define a second half-bridge configuration. As described further below, each IGBT 512, 514, 516, and 518 is coupled to controller 252 (shown in FIG. 2) that regulates the status of IGBTs 512, 514, 516, and 518. Specifically, controller 252 and IGBTs 512, 514, 516, and 518 are configured to maintain at least a first portion of IGBTs 512, 514, 516, and 518 in an OFF status and a second portion of IGBTs 512, 514, 516, and 518 in an ON status to facilitate shifting switching operation of DC/DC power converter 500 from full-wave conversion to half-wave conversion and back to full-wave conversion to at least partially regulate the output voltage of DC/DC power converter 500. In full-wave conversion, IGBTs 512, 514, 516 and 518 are in switching operation. In half-wave conversion, only IGBTs 512 and 514 or IGBTs 516 and 518 are in switching operation. When IGBTs 512 and 514 are in switching operation, IGBTs 516 and 518 are in OFF status. When IGBTs 516 are 518 are in switching operation, IGBTs 512 and 514 are in OFF status. Alternative operations of IGBTs 512 and 514 in ON status and 516 and 518 in ON status are controlled to balance the voltage of DC link cap 526 and 528 to be roughly half of the PV input voltage.

DC/DC power converter 500 is switched between these two half-wave conversion modes to maintain DC link 522 and 524 within voltage limits.

Further, in this alternative embodiment, first half-bridge resonant converter circuit 504 and second half-bridge resonant converter circuit 506 each include a resonant section 530 and 532, respectively. Each resonant section 530 and 532 includes a resonant capacitive device 534 and 536, respectively, and a HF transformer 538 and 540, respectively. HF transformer 538 includes a plurality of inductive devices 542 and 544 in series with resonant capacitive device 534 such that first half-bridge resonant converter circuit 504 is a resonant LLC converter circuit. Similarly, HF transformer 540 includes a plurality of inductive devices 546 and 548 in series with resonant capacitive device 536 such that second half-bridge resonant converter circuit 506 is also a resonant LLC converter circuit. Resonant section 530 and 532 with HF transformer 538 and 540, respectively provides isolation capabilities for DC/DC power converter 500 with relatively low electrical losses. The core of HF transformers 538 and 540 is fabricated from low-cost ferrite. Alternatively, any core material that enables operation of HF transformers 538 and 540, first half-bridge resonant converter circuit 504, second half-bridge resonant converter circuit 506, and DC/DC power converter 500 as described herein is used.

Moreover, in this alternative embodiment, each of first half-bridge resonant converter circuit 504 and second half-bridge resonant converter circuit 506 include an output section 550 and 552, respectively, where output sections 550 and 552 are coupled in parallel and include a plurality of rectifying diodes 554 and 556, respectively, and a plurality of capacitive devices 558 and 560, respectively, to facilitate DC voltage generation.

Dual bridge resonant converter circuit 502 receives and converts 1.5 kV DC to 10 kV DC (positive or negative polarity) with a nominal switching frequency of approximately 20 kHz and a power rating of approximately 150 kW. Since, DC/DC power converter 500 is rated for approximately 3 MW, converter 500 includes at least 20 dual bridge resonant converter circuits 502. Either first half-bridge resonant converter circuit 504 or second half-bridge resonant converter circuit 506 receives and converts 750 V DC to 10 kV DC (positive or negative polarity) with a nominal switching frequency of approximately 20 kHz and a power rating of approximately 75 kW. Alternatively, dual bridge resonant converter circuit 502, first half-bridge resonant converter circuit 504, second half-bridge resonant converter circuit 506, and DC/DC power converter 500 are configured for any input voltage, output voltage, electric power transmission, and switching frequency ratings that enable operation of dual bridge resonant converter circuit 502, DC/DC power converter 500, and renewable power generation facility 200 as described herein.

As described above for DC/DC power converter 300 (shown in FIG. 3), each PV string 204 includes a respective diode stack 210 (both shown in FIG. 2) between respective DC/DC power converter 208/500 and MVDC bus 209 (shown in FIG. 2) configured to facilitate unidirectional transmission of electric power from respective DC/DC power converter 208/500 to MVDC bus 209 and to facilitate blocking electric power flow from MVDC bus 209 to DC/DC power converter 500. In alternative embodiments of DC/DC power converter 500, where bi-directional power flow is needed through MVDC collector system 202 (shown in FIG. 2), a stack of high voltage switches (not shown) are added to output sections 550 and 552 of dual resonant DC/DC power converter 500 in the place of rectifying diodes 554 and 556 to enable bi-directional power.

Further, as described above, and in a manner similar to DC/DC power converter 300 as further described above with respect to FIG. 4, voltage regulation of DC/DC power converter 500 is facilitated through regulation of the switching frequency of IGBTs 512, 514, 516, and 518, reconfiguration between full-wave and half-wave conversion, and maximum power point tracking (MPPT) features.

Figure 6:
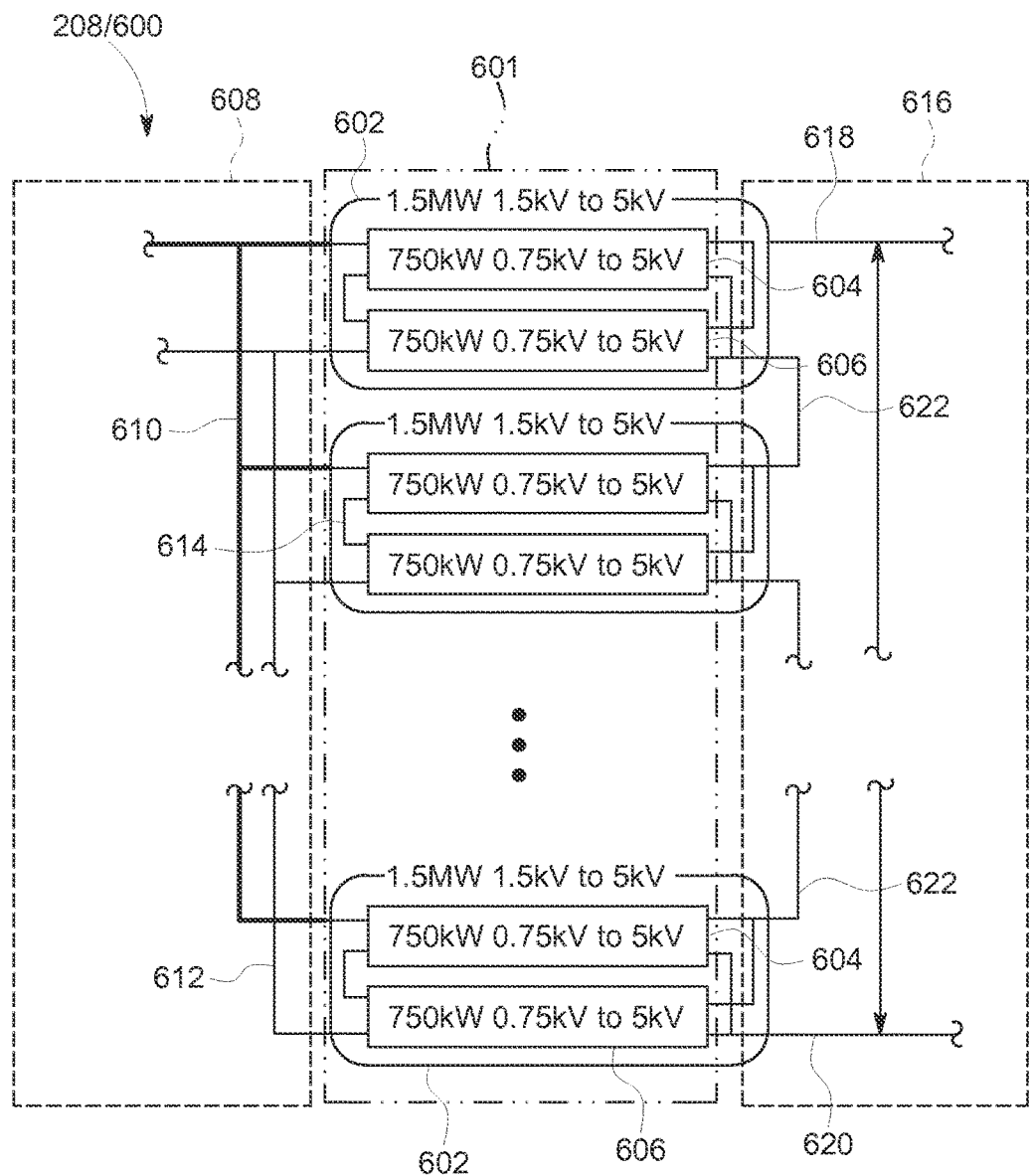
FIG. 6 is a schematic view of a portion of another alternative DC/DC power converter that may be used with the renewable power generation facility shown in FIG. 2.

FIG. 6 is a schematic view of a portion of another alternative DC/DC power converter 600 that may be used as DC/DC power converter 208 with renewable power generation facility 200 (shown in FIG. 2). More specifically, FIG. 6 shows a multi-level modular resonant power converter 208/600 that includes a power conversion section 601 that includes a plurality of power converter modules 602.

In this alternative embodiment, each power converter module 602 includes two half-bridge resonant converter circuits, i.e., first half-bridge resonant converter circuit 604 and second half-bridge resonant converter circuit 606. Each of converter circuits 604 and 606 is substantially similar to first half-bridge resonant converter circuit 504 and second half-bridge resonant converter circuit 506 (both shown in FIG. 5). Alternatively, in some embodiments, converter circuits 604 and 606 include MOSFETs rather than IGBTs.

DC/DC power converter 600 includes an input section 608 coupled to power conversion section 601 and each of power converter modules 602. Input section 608 includes a positive polarity bus 610 and a negative polarity bus 612, where buses 610 and 612 are coupled to a DC link (not shown). Each of power converter modules 602 are coupled in parallel to positive polarity bus 610 and each of power converter modules 604 are coupled in parallel to negative polarity bus 612. Also, each first half-bridge resonant converter circuit 604 is coupled in series with associated second half-bridge resonant converter circuit 606 through an electrical conductor 614 within power converter modules 602. Input section 608 is configured to provide a voltage input of approximately 1.5 kV DC.

DC/DC power converter 600 also includes an output section 616 coupled to power conversion section 601 and each of power converter modules 602. Output section 616 includes a positive polarity bus 618 and a negative polarity bus 620. Alternatively, the polarity of buses 618 and 620 are reversed. First half-bridge resonant converter circuit 604 and second half-bridge resonant converter circuit 606 are coupled in a parallel configuration on the output side. Also, each second half-bridge resonant converter circuit 606 is coupled in series with a first half-bridge resonant converter circuit 604 in an adjacent power converter module 602 through an electrical conductor 622 therebetween. Output section 616 is configured to provide a voltage output of approximately 10 kV DC with either of the two possible polarities.

Also, in this alternative embodiment, first half-bridge resonant converter circuit 604 and second half-bridge resonant converter circuit 606 each define a half-bridge configuration and are coupled to controller 252 (shown in FIG. 2) that regulates the status of converter circuits 604 and 606. Specifically, controller 252 and converter circuits 604 and 606 are configured to shift between an OFF status and an ON status to facilitate shifting switching operation of DC/DC power converter 500 from full-wave conversion to half-wave conversion and back to full-wave conversion to at least partially regulate the output voltage of DC/DC power converter 600. In full-wave conversion, both converter circuits 604 and 606 are in an ON status. In half-bridge operation, one of converter circuits 604 and 606 is in an ON status the other converter circuit 606 and 604 is in an OFF status. Further, as described above, and in a manner similar to DC/DC power converter 300 as further described above with respect to FIG. 4, voltage regulation of DC/DC power converter 600 is facilitated through regulation of the switching frequency of either the IGBTs or the MOSFETs in power conversion section 601, reconfiguration between full-wave and half-wave conversion, and maximum power point tracking (MPPT) features.

When in full-wave conversion, each of first half-bridge resonant converter circuit 604 and second half-bridge resonant converter circuit 606 receives and converts 1.5 kV DC to 10 kV DC (positive or negative polarity) with a nominal switching frequency of approximately 5 kHz and a power output of approximately 750 kW. As such, when in full-wave conversion, each power converter module 602 receives and converts 1.5 kV DC to 10 kV DC (positive or negative polarity) with a nominal switching frequency of approximately 5 kHz and a power output of approximately 1.5 MW. Since, DC/DC power converter 600 is rated for approximately 6 MW, converter 600 includes at least 4 power converter modules 602. When in half-wave conversion, either of first half-bridge resonant converter circuit 604 or second half-bridge resonant converter circuit 606 receives and converts 750 V DC to 5 kV DC (positive or negative polarity) with a nominal switching frequency of approximately 5 kHz and a power rating of approximately 750 kW. Alternatively, multi-level modular resonant power converter 208/600, power converter modules 602, and converter circuits 604 and 606 are configured for any input voltage, output voltage, electric power transmission, and switching frequency ratings that enable operation of renewable power generation facility 200 as described herein.

Alternative embodiments of renewable power generation facility 200 (shown in FIG. 2) include other power generation devices that generate AC power, e.g., wind turbines, in contrast to the DC power generated by solar arrays 206 (shown in FIG.2). Generally, a wind turbine includes a rotor that includes a rotatable hub assembly having multiple blades. The blades transform wind energy into a mechanical rotational torque that drives one or more generators via the rotor. Variable speed operation of the wind turbine facilitates enhanced capture of energy when compared to a constant speed operation of the wind turbine. However, variable speed operation of the wind turbine produces electric power having varying voltage and/or frequency. More specifically, the frequency of the electric power generated by the variable speed wind turbine is proportional to the speed of rotation of the rotor. Typically, full power conversion assemblies, i.e., alternative embodiments of the power converters described herein that include an electrical rectification device and an inverter device, may be coupled between the wind turbine's electric generator and utility grid 242 (shown in FIG. 2). The full power conversion assembly receives the electric power from the wind turbine generator and transmits electricity having a fixed voltage and frequency for further transmission to utility grid 242.

In these alternative embodiments, the full power conversion assemblies include rectifiers for converting the AC generated by the wind turbine generator to DC power. Also, such full power conversion assemblies include an inverter coupled to the rectifier by a DC link to convert the DC power to AC power. Further, the rectifiers and inverters in such full power conversion assemblies include a plurality of semiconductor devices similar to MOSFETs 302 through 308 (shown in FIG. 3) and IGBTs 512 through 518 (shown in FIG. 5). Moreover, such rectifiers and inverters are fully scalable for electric power conversion applications of any size, any voltage, any number of phases, and any frequencies. As such, DC/DC power converters 208/300/500/600 as described herein may be used prior to the DC/AC inverters to obtain similar benefits for the solar-based systems.

The above described medium voltage direct current (MVDC) solar collector systems and solar power generation facilitate improved operational capabilities as compared to known low voltage direct current (LVDC) solar collector systems. The MVDC solar collector systems described here facilitate removing many individual DC-to-alternating current (AC) (DC/AC) power converters and step-up transformers from each string of photovoltaic (PV) arrays, thereby significantly decreasing balance of plant costs associated with solar power generation facilities. The systems and facilities described herein include isolable DC/DC power converters that are resonant power converters including high-frequency (HF) transformers (within a range of approximately 5 kiloHertz (kHz) and approximately 100 kHz). Such DC/DC power converters are configured to step-up LVDC voltages within a range between approximately 0.6 kilovolts (kV) and approximately 1.5 kV to MVDC with a range between approximately 2 kV and approximately 40 kV. The increased frequency range facilitates increasing the energy efficiency of the power converters and facilitating maximum power point tracking (MPPT) features in the control strategy of individual strings. One embodiment of the isolable DC/DC power converters includes circuits that have a power rating of approximately 150 kiloWatts (kW) with a switching frequency up to approximately 100 kHz through switches such as silicon carbide (SiC) metal-oxide-semiconductor field-effect transistors (MOSFETs) and low-cost ferrite core material in the HF transformer. Another embodiment of the isolable DC/DC power converters has a circuit that has a power rating of approximately 1.5 megaWatt (MW) with a switching frequency of approximately 5 kHz power through switches of either silicon-based insulated-gate bipolar transistors (IGBTs) or SiC MOSFETs.

The isolable DC/DC power converters described herein facilitate extending the voltage and power operating ranges through adaptive and configurable full-bridge/half-bridge operation. Also, the embodiments for the isolable DC/DC power converters described herein facilitate extending the voltage and power operating ranges through use of HF switching operation of the switches, where MPPT voltage and power control features within the control strategy of the isolable DC/DC power converters are a function of the HF frequency employed. Moreover, the embodiments for the isolable DC/DC power converters described herein facilitate extending the voltage and power operating ranges through use of series/parallel configurations. Furthermore, voltage control in the embodiments of the isolable DC/DC power converters described herein facilitate rapid and significant decreases of the voltage gain of the power converters when either an overload condition or a short circuit condition is sensed, thereby substantially isolating the affected DC/DC power converter from an interconnecting MVDC bus and the other converters, at least one of which is faulted. Additionally, a diode is positioned between the MVDC bus and each DC/DC power converter to further facilitate isolation of the converters to allow only unidirectional power flow out of the DC/DC power converters into the MVDC bus.

An exemplary technical effect of the methods, systems, and apparatus described herein includes at least one of: (a) increasing the energy efficiency of power conversion systems, especially renewable power generation facilities, through integration of MVDC collector systems; (b) decreasing balance of plant costs for facilities with power conversion systems by eliminating a number of DC/AC converters, circuit breakers, and noise filtering equipment; (c) implementing MPPT features into individual PV strings, thereby increasing power and voltage control and flexibility of the power conversion systems and facilities; (d) extending voltage and power control and flexibility of individual PV strings through adaptive and configurable full-bridge/and half-bridge operation; (e) extending voltage and power control and flexibility of individual PV strings through HF switching operations of the switching devices in the respective DC/DC power converters; (f) facilitating rapid isolation of faults through significant and rapid decreases in voltage gain; (g) facilitating rapid isolation of faults on individual strings through a diode positioned on each string; (h) enhancing a fault-tolerance of power conversion and generation systems and facilities by quickly isolating faulted portions of the systems and facilities; and (i) enhancing granular control in half bridge switching operation as compared to full bridge switching operation.

Exemplary embodiments of MVDC power conversion systems, and DC/DC power converters are described above in detail. The MVDC power conversion systems and DC/DC power converters, and methods of operating such systems and devices are not limited to the specific embodiments described herein, but rather, components of systems and/or steps of the methods may be utilized independently and separately from other components and/or steps described herein. For example, the systems, apparatus, and methods may also be used in combination with other systems requiring efficient power conversion and rapid fault isolation capabilities, and are not limited to practice with only the facilities, systems and methods as described herein. Rather, the exemplary embodiment can be implemented and utilized in connection with many other power conversion applications that are configured to convert electric power, e.g., and without limitation, geothermal power generation facilities and wind turbine power generation facilities.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A medium voltage direct current (MVDC) collector system for renewable power generation facilities, said MVDC collector system comprising:
at least one renewable energy generation device;
at least one direct current (DC)-to-DC (DC/DC) power converter coupled to said at least one renewable energy generation device, said at least one DC/DC power converter configured to shift a switching operation of said DC/DC power converter between full-wave conversion and half-wave conversion;
at least one controller coupled to said at least one DC/DC power converter, said at least one controller configured to regulate shifting the switching operation of said at least one DC/DC power converter between full-wave conversion and half-wave conversion;
wherein said at least one DC/DC power converter comprises a full-bridge converter comprising an input DC link;
wherein the full-bridge converter comprises a plurality of switching devices, each switching device of said plurality of switching devices is directly connected to either a positive terminal or a negative terminal of the same input DC link; and
wherein the MVDC collector system further comprises a distributed energy storage system having a plurality of distributed energy storage devices, each distributed energy storage device includes storage batteries and momentum devices and is coupled to the said at least one DC/DC power converter through a distributed DC/DC power converter.

2. The MVDC collector system in accordance with claim 1, wherein each switching device of said plurality of switching devices is coupled to said at least one controller, said at least one controller further configured to maintain at least a first portion of said plurality of switching devices in an OFF status and a second portion of said plurality of switching devices in an ON status to facilitate shifting the switching operation of said at least one DC/DC power converter from full-wave conversion to half-wave conversion.

3. The MVDC collector system in accordance with claim 1, wherein said at least one DC/DC power converter comprises a plurality of DC/DC conversion modules, each DC/DC conversion module of said plurality of DC/DC conversion modules comprising an input section coupled to said at least one renewable energy generation device and an output section.

4. The MVDC collector system in accordance with claim 3, said each DC/DC conversion module of said plurality of DC/DC conversion modules coupled to said at least one controller, said at least one controller configured to regulate switching said plurality of DC/DC conversion modules between an ON status and an OFF status to facilitate shifting the switching operation of said at least one DC/DC power converter from full-wave conversion to half-wave conversion.

5. The MVDC collector system in accordance with claim 1, wherein said full bridge converter comprises a single resonant converter further comprising a high-frequency (HF) transformer and at least one resonant capacitor coupled in series with said HF transformer, said HF transformer comprising at least one inductive device, said at least one inductive device and said at least one resonant capacitor define a resonant tank circuit.

6. The MVDC collector system in accordance with claim 1, wherein said at least one controller is further configured to use maximum power point tracking (MPPT) to regulate power conversion through said at least one DC/DC power converter.

7. The MVDC collector system in accordance with claim 6, wherein said at least one DC/DC power converter comprises a plurality of switching devices, each switching device of said plurality of switching devices coupled to said at least one controller, said at least one controller further configured to maintain at least a first portion of said plurality of switching devices in an OFF status and a second portion of said plurality of switching devices in an ON status to facilitate shifting the switching operation of said at least one DC/DC power converter from full-wave conversion to half-wave conversion, said at least one controller further configured to regulate the switching frequency of said plurality of switching devices.

8. The MVDC collector system in accordance with claim 7, wherein said plurality of switching devices is configured to switch within a range of frequencies between approximately 5 kiloHertz (kHz) and approximately 100 kHz.

9. The MVDC collector system in accordance with claim 7 wherein said at least one controller is further configured to regulate a voltage gain of said at least one DC/DC power converter through regulation of the switching frequency of said plurality of switching devices.

10. The MVDC collector system in accordance with claim 9, wherein said at least one controller is further configured to:
receive real-time values of electric power transmitted through said at least one DC/DC power converter;
regulate the switching frequency of said plurality of switching devices to regulate the voltage gain of said at least one DC/DC power converter as a function of the real-time values of electric power transmitted through said at least one DC/DC power converter;
shift the switching operation of said at least one DC/DC power converter between full-wave conversion and half-wave conversion as a function of the real-time values of electric power transmitted through said at least one DC/DC power converter; and
decrease the switching frequency of said plurality of switching devices to decrease the voltage gain of said at least one DC/DC power converter under fault condition, thereby facilitating isolation of said at least one DC/DC power converter.

11. The MVDC collector system in accordance with claim 6, wherein said at least one controller is further configured to regulate a voltage gain of said at least one DC/DC power converter as a function of load on said at least one DC/DC power converter.

12. The MVDC collector system in accordance with claim 1, wherein said at least one DC/DC power converter comprises a plurality of DC/DC power converters and said at least one renewable energy generation device comprises a plurality of renewable energy generation devices, each DC/DC power converter of said plurality of DC/DC power converters and each renewable energy generation device of said plurality of renewable energy generation devices define a string of a plurality of strings, said MVDC collector system further comprising a MVDC bus, wherein said plurality of strings are coupled to said MVDC bus, each string of said plurality of strings further comprising at least one diode positioned between and coupled to said each DC/DC power converter and said MVDC bus.

13. The MVDC collector system in accordance with claim 12, wherein said plurality of strings are devoid of DC-to-alternating current (AC) (DC/AC) converters, step-up transformers, and circuit breakers.

14. The MVDC collector system in accordance with claim 1 further comprising at least one electric power storage device coupled to said at least one DC/DC power converter.

15. A renewable energy generation facility comprising:
a direct current (DC) bus;
a plurality of renewable energy generation devices;
a plurality of direct current (DC)-to-DC (DC/DC) power converters, each DC/DC power converter of said plurality of DC/DC power converters coupled to at least one renewable energy generation device of said plurality of renewable energy generation devices, said each DC/DC power converter configured to shift a switching operation between full-wave conversion and half-wave conversion, each DC/DC power converter of said plurality of DC/DC power converters is coupled to said DC bus via a diode stack, wherein the diode stack is directly connected to an output terminal of the DC/DC power converter of said plurality of DC/DC power converters and blocks electric power flow from the said DC bus to the DC/DC power converter of said plurality of DC/DC power converters and allows only unidirectional transmission of electric power from respective DC/DC power converter to the DC bus; and
at least one controller coupled to said at least one DC/DC power converter, said at least one controller configured to regulate shifting the switching operation of said at least one DC/DC power converter between full-wave conversion and half-wave conversion.

16. The renewable energy generation facility in accordance with claim 15, wherein said at least one controller is further configured to use maximum power point tracking (MPPT) to regulate power conversion through the at least one DC/DC power converter.

17. The renewable energy generation facility in accordance with claim 16, wherein the at least one DC/DC power converter includes a plurality of switching devices, and wherein said at least one controller uses MPPT by:
regulating the switching frequency of the plurality of switching devices; and
regulating a voltage gain of the at least one DC/DC power converter as a function of load on the at least one DC/DC power converter.

18. The renewable energy generation facility in accordance with claim 16, wherein the at least one DC/DC power converter includes a plurality of switching devices, said at least one controller is further configured to regulate a voltage gain of the at least one DC/DC power converter by regulating the switching frequency of the plurality of switching devices.

19. The renewable energy generation facility in accordance with claim 18, wherein said at least one controller regulates the voltage gain of the at least one DC/DC power converter by:

receiving real-time values of electric power transmitted through the at least one DC/DC power converter;
regulating the switching frequency of the plurality of switching devices to regulate the voltage gain of the at least one DC/DC power converter as a function of the real-time values of electric power transmitted through the at least one DC/DC power converter;
shifting the switching operation of the at least one DC/DC power converter between full-wave conversion and half-wave conversion as a function of the real-time values of electric power transmitted through the at least one DC/DC power converter; and
decreasing the switching frequency of the plurality of switching devices to decrease the voltage gain of the at least one DC/DC power converter under fault condition, thereby facilitating isolation of the at least one DC/DC power.

20. The renewable energy generation facility in accordance with claim 15 further comprising a medium voltage alternating current (MVAC) collector system coupled to the at least one electrical bus through a DC/AC power converter and a second diode stack, wherein the second diode stack blocks electric power flow from the DC/AC power converter to the at least one electrical bus.

21. A medium voltage direct current (MVDC) collector system for renewable power generation facilities, said MVDC collector system comprising:
at least one renewable energy generation device;
at least one direct current (DC)-to-DC (DC/DC) power converter coupled to said at least one renewable energy generation device, said at least one DC/DC power converter configured to shift a switching operation of said DC/DC power converter between full-wave conversion and half-wave conversion;
at least one controller coupled to said at least one DC/DC power converter, said at least one controller configured to regulate shifting the switching operation of said at least one DC/DC power converter between full-wave conversion and half-wave conversion; and
wherein said at least one DC/DC power converter comprises a first half-bridge resonant converter and a second half-bridge resonant converter coupled in series to said at least one renewable energy generation device;
wherein the first half-bridge resonant converter includes a first resonant capacitive device and a first high frequency transformer; and
wherein the second half-bridge resonant converter includes a second resonant capacitive device different than the first resonant capacitive device and a second high frequency transformer different than the first high frequency transformer.

22. The MVDC collector system in accordance with claim 21, wherein said at least one controller is configured to alternate at least one first half-bridge converter of said plurality of half-bridge converters and at least one second half-bridge converter of said plurality of half-bridge converters between the OFF status and the ON status to facilitate shifting the switching operation of said at least one DC/DC power converter from full-wave conversion to half-wave conversion.

23. The MVDC collector system in accordance with claim 21 wherein said plurality of half-bridge resonant converters comprise a plurality of switching devices, each switching device of said plurality of switching devices coupled to said at least one controller, said at least one controller further configured to maintain said plurality of switching devices in switching operation during full-wave conversion and wherein the said at least one controller is further configured to maintain at least a first portion of said plurality of switching devices in an OFF status and a second portion of said plurality of switching devices switching operation during half-wave conversion.

* * * * *